United States Patent Office 3,262,766
Patented July 26, 1966

3,262,766
RARE-EARTH OXIDES FOR POLISHING GLASS
Frederick C. Nonamaker, Gloucester, N.J., assignor to W. R. Grace & Co., New York, N.Y., a corporation of Connecticut
No Drawing. Filed Nov. 21, 1963, Ser. No. 325,451
The portion of the term of the patent subsequent to Apr. 28, 1981, has been disclaimed
6 Claims. (Cl. 51—308)

This application is a continuation-in-part of my co-pending application U.S. Serial No. 111,453, filed May 22, 1961, now abandoned.

This invention relates to an improved polishing material adapted for use in polishing glass, ceramics, or other glass-like materials, and to a specific method for preparing such a polishing material. In one particular aspect, it relates to a novel polishing compound and a method of preparing this compound.

There is a considerable commercial need for polishing compounds, especially in the glass and optical industries. The compositions normally used at present are the "red rouge," which is a mixture of finely divided iron oxide, and so-called "white rouge" which is a quartz material. Red rouge is objectionable in that it tends to color the material being processed and it causes considerable problem with damage to the clothing of the workers because of the red color in the material. Red rouge is generally obnoxious in the working area for these reasons. White rouge has been used as a substitute for red rouge of commerce in some areas but it has not been a particularly successful substitute because of its rather low polishing efficiency.

In addition to the rouges there are certain other commercially available materials which are used in the glass polishing industry. These materials are highly efficient but their commercial use on a large scale has been restricted because of the high cost of the materials.

I have found that a highly efficient polishing compound can be prepared at a price competitive to the red rouge of commerce by the treatment of commercially available mixtures of rare-earth carbonates with hydrofluosilicic or hydrofluoric acid under certain specific conditions. The product of my invention has several advantages in that the costs of making this material are greatly reduced in part due to the reduction of the firing temperature of the product.

Briefly the process comprises treating a carbonate material that contains about 74% rare-earth oxides with hydrofluosilicic acid and firing the product. The broad limits for each of the components would fall in the following range:

Rare-earth oxides _____ Approximately 90%.
$SiO_2$ _____ 0-5%.
Fluorine _____ 5-9%.

The rare-earth materials used in the process are commercially available as the carbonates. These compositions are prepared in the decomposition of monazite sand and are thus a by-product of thorium production. The thorium is first removed from the monazite substantially completely and the residual material is converted to the carbonate. A typical analysis of this rare-earth carbonate composition is as follows:

Rare-earth oxides _____ 74.82%
Total volatiles _____ 25.18%
                                          ———————
                                          100.00%

Cerium oxide, $CeO_2$ _____ 34.20%
Calcium oxide, $CaO$ _____ .17%
Sodium oxide, $Na_2O$ _____ .48%
Sulphate as $SO_2$ _____ .05%
Chlorides as $Cl$ _____ .01%
Phosphates as $P_2O_5$ _____ .042%

In the first step of my process the rare-earth material, rare-earth carbonate, is slurried with water at room temperature. The slurry is then reacted with hydrofluosilicic acid using conventional equipment. The slurry is then filtered and wet fired at a temperature of about 1200° F. The product recovered is an extremely fine powder with a light color, which is distinctive being a light yellow with a faintly pink tinge.

Although the best results were obtained using rare-earth carbonates, other compounds of this mixture of rare earths could be used successfully. Thus the chloride, the sulfate, the nitrate, etc., could be treated as well with hydrofluosilicic acid to yield the polishing compound of my invention.

The hydrofluosilicic acid may be added in a quantity equal to approximately 5 to 15 percent by weight of the rare-earth oxides present. The preferred amount is 10% by weight of the rare-earth compound as hydrofluosilicic acid.

One of the principal advantages of the operation of this process is the fact that a superior product can be prepared by firing at relatively low temperatures: thus, it was found that a superior polishing compound could be made by firing the rare-earth carbonate that had been treated with hydrofluosilicic acid to the temperature in the range of 900–1300° F., the preferred temperature being 1200° F.

Polishing powders may be evaluated in terms of performance using different methods. One variable known to be important is that of the load applied to the surface being polished. Another variable is the slurry concentration in which the material is used. Work was conducted therefore, to determine the effect of these variables on the abrasive power of a selected polishing material and the following method selected.

The polishing compounds of this invention were evaluated by determining the abrasive power of each of the compounds. The abrasive powers were determined using an automatic bowl feed power shift with accessories for polishing two-inch diameter flat optical glass lens blanks. A minimum of 5 lens blanks was used for each test with each polishing material. These blanks were finished ground on one surface using FFF grade silicon carbide and then were weighed on a chemical balance before polishing. Each lens was polished for ten minutes in the machine using a polishing slurry which consisted of 16.6 gms. of solid material mixed with 100 cubic centimeters of water. The counterweight on a polishing machine was kept in a forward position for all tests. With the weight in this position, the pressure on the lens was 2.86 pounds per square inch. After polishing, each lens was again weighed and a loss in weight determined. The average value of this loss in weight was reported as abrasive power or A.P.

The important limitations as to polishing compounds are melting point, hardness and size. It is, of course, important that the polishing compound have a melting point above the glass or other material being polished. The particle size distribution of these compounds is also quite important. The particles should be in the 5-20 micron range. Good results are obtained when 60% of the material has a particle size between 5 and 20 microns. Excellent results are obtained when the rare earth-fluorine-containing composition is composed of about 83% of particles having a particle size of less than 5 microns, about 16% of the particles having a particle size of 5–10 microns and about 1% of the particles having a particle size of 10–20 microns.

The invention is illustrated by the following specific but non-limiting examples:

EXAMPLE I 16.6 grams of the polishing material and 100 cc. of water were added to a 1⅞ inch spectacle lens blank on a standard polishing wheel. Each 30 seconds the polishing was interrupted, the lens was removed, cleaned and examined under a clear glass incandescent lamp. Starting with a spectacle lens in a fine condition using the polishing compounds of our invention, a highly polished brilliant surface containing no pits or lines was obtained in six minutes. Under the same test conditions, it took slightly more than ten minutes to produce a comparably polished surface with red rouge and even longer to produce a surface of the same quality with white rouge. To illustrate the superior polishing efficiency of the rare earth-fluorine composition of my invention, the abrasive power of the material was determined using the method described above.

EXAMPLE II

The abrasive power of these materials was determined. This is a determination of the number of milligrams of glass removed from a 1⅞" spectacle lens blank in ten minutes, using the standard bowl feed polisher described above and with the gradual addition of 16.6 grams of the polishing material in 100 cc. of water. The comparative results of the rare earth-fluorine-containing composition and the results obtained using vitreous silica are set out in Table I below.

*Table I*

| Polishing material: | Abrasive power |
|---|---|
| Vitreous silica | 18 |
| Rare earth-silicia-fluorine composition | 60 |

It is apparent from an examination of these data that the polishing compound of my invention is greatly superior to the vitreous silica polishing compounds of the prior art. Various methods for preparing my novel composition may be used. These methods are described in the examples which follow:

EXAMPLE III

The rare earth polishing powder composition was prepared from carbonate described above. In these runs, a charge of 150 grams of commercial carbonate, slurried in 500 ml. of water at room temperature, was treated in a suitable stirrer-equipped vessel, with 36 grams of 30% hydrofluosilicic acid diluted to 500 ml., with water at room temperature. After 60 minutes of agitation, for dropwise addition of the dilute hydrofluosilicic acid to the slurry, agitation was continued for an additional 60 minutes. The batch was then filtered on a standard filter to a dense firm cake and the cake fired wet at a temperature of 1200° F. for 80 minutes, after which the product was removed from the furnace. The polishing powder was extremely fine with a yellow color faintly tinged with pink. The A.P. value obtained was 60.

EXAMPLE IV

The rare earth polishing composition was prepared from the carbonate using the procedure of Example III. The same weight of carbonate, the same conditions and the same firing temperature were used. The only change in the procedure was that 18 grams of hydrofluoric acid in 500 ml. of water was substituted for the hydrofluosilicic acid of Example III. An excellent product with an A.P. value of 52.6 was obtained.

EXAMPLE V

Plant run batches of this product were made using essentially the same steps without any material handling difficulties. The fired product had an A.P. value comparable to that obtained in laboratory batches. The finished product was analysed; the analysis is as follows:

| | Percent |
|---|---|
| Rare-earth oxides | 90.12 |
| $SiO_2$ | 4.86 |
| Fluorine | 7.0 |

EXAMPLE VI

The price of the rare-earth chlorides is lower than the price of the rare-earth oxides so an attempt was made to prepare my novel polishing compound starting with a chloride as a raw material. In this run the chlorides were prepared from the carbonate material of commerce. The chloride was reacted with $H_2SiF_6$ in a proportion of about 10% by weight of the rare-earth compound used.

In this typical run, 250 gm. of commercial rare-earth chloride (approx. 44% rare-earth oxides) was dissolved in water at room temperature to give a volume of 2500 ml. This solution had a density of 9.0° Bé. at 25° C. and contained approximately 45 grams per liter of rare-earth oxides, or a total of 112 gm. After addition of 36 grams of 30% hydrofluosilicic acid, giving a slight turbidity and a pH of 1.0, the solution in an agitator-equipped beaker was treated with solid soda ash, added in small portions over a period of 2 hours. The rare earths were found to have been completely precipitated when the pH of the slurry reached 7.6. Upon standing overnight, the precipitate settled to ⅓ the total volume. The clear supernatant liquid was decanted and the settled solids thrown on a suction filter, giving a dense firm cake, which was washed with water at room temperature until wash came through chloride-free. Soda ash required was 106 grams, and the hydrofluosilicic acid used approximately 10% of the weight of rare-earth oxides. The cake was wet fired at 1200° F. for 1 hour. All products from runs of this type had an A.P. value approximately the same as that of powder prepared from carbonate of commerce.

EXAMPLE VII

In this run the polishing powder was prepared from a mixture of sodium double salts of the rare earths having the general formula of $R_2(SO_4)_3 \cdot Na_2SO_4 \cdot 2H_2O$, and containing 43.6% rare-earth oxides in the dry salt. In these runs, the double salt was precipitated from solution with sodium sulphate, and the resultant rare-earth double salt converted to rare-earth hydroxides by means of sodium hydroxide metathesis.

In a typical run a charge of 255 grams of double salt, dry weight, was treated at room temperature with 1350 ml. of 2 N sodium hydroxide, using the standard counter current principle. The reaction time was 8 hours. The final sodium hydroxide slurry was allowed to stand and settle and the supernatant liquid decanted. The hydroxides were washed by decantation with water at approximately 25° C., until wash was free of $SO_4$. The hydroxides were thrown on a suction filter and quickly filtered to form a cake. The amount of double salt taken represented 111 grams of rare-earth oxides and the hydroxides derived therefrom were treated with 36 grams of 30% hydrofluosilicic acid, following the procedure employed in treating the same weight of rare-earth oxides as carbonate. The cake of treated hydroxides was wet fired at 1382° F. for 80 minutes. The product had the same appearance as that made by treatment of carbonate and the A.P. value obtained was as good.

It is apparent from an examination of the data presented and the tables above and in Examples I through VI that a satisfactory polishing compound can be prepared from the commercially available rare-earth compositions using several techniques. The product has a different chemical composition than the products of the prior art and the polishing powder is greatly superior to any previously known polishing compositions.

Obviously, many modifications and variations of the invention, as hereinabove set forth, may be made without departing from the essence and scope thereof and only such limitations should be applied as are indicated in the appended claims.

What is claimed is:

1. A polishing material consisting essentially of a mixture of approximately 90% by weight rare-earth oxides, 0 to 5% by weight silica and 5 to 9% by weight fluorine, the particles of said material being in the 5 to 20 micron size range.

2. A polishing material consisting essentially of 5 to 9% by weight fluorine and those cerium group rare-earth oxides that naturally occur in monazite sands as salts of the rare earths, the particles of said material being in the 5 to 20 micron size range.

3. A polishing material consisting essentially of 0 to 5% by weight silica, 5 to 9% by weight fluorine and those cerium group rare-earth oxides that naturally occur in monazite sands as salts of the rare earths, the particles of said material being in the 5 to 20 micron size range.

4. A polishing material consisting essentially of 0 to 5% by weight silica, 5 to 9% by weight fluorine and approximately 90% by weight cerium group rare-earth oxides having a particle size of 5 to 20 microns.

5. A polishing material consisting essentially of approximately 90% by weight of cerium group rare-earth oxides and the balance fluorine, at least 60% by weight of said material having a particle size of less than 5 microns, the balance having a particle size between 5 and 20 microns.

6. A polishing material consisting essentially of approximately 90% by weight of cerium group rare-earth oxides, up to 5% by weight silica and 5 to 9% by weight fluorine, at least 60% by weight of said material having a particle size of less than 5 microns, the balance having a particle size between 5 and 20 microns.

References Cited by the Examiner
UNITED STATES PATENTS

| | | | |
|---|---|---|---|
| 2,744,001 | 5/1956 | Harman et al. | 51—308 |
| 3,131,039 | 4/1964 | Nonamaker | 51—293 |

ALEXANDER H. BRODMERKEL, *Primary Examiner.*

D. J. ARNOLD, *Assistant Examiner.*